D. H. FARNAM.
Bee Hive.
No. 2,633.
Patented May 20, 1842.
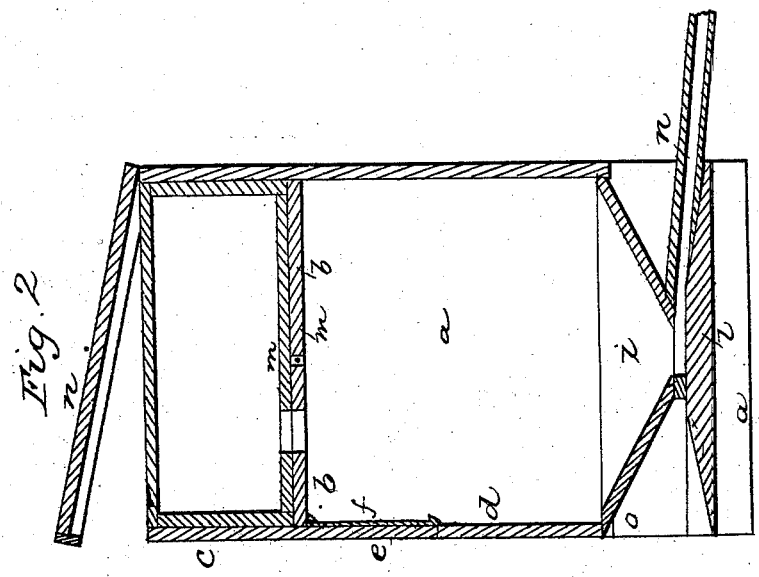
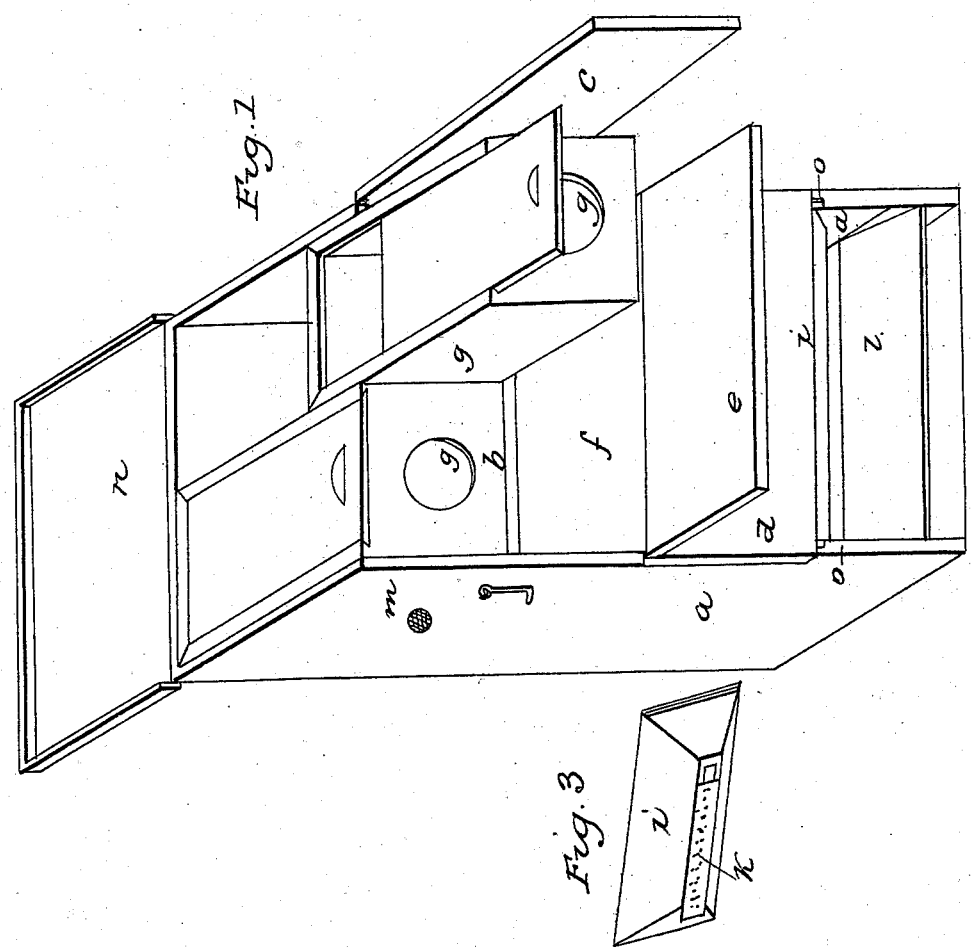
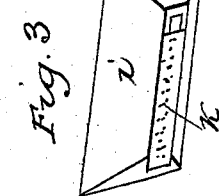

UNITED STATES PATENT OFFICE.

DANIEL H. FARNAM, OF LITCHFIELD, CONNECTICUT.

BEEHIVE.

Specification of Letters Patent No. 2,633, dated May 20, 1842.

*To all whom it may concern:*

Be it known that I, DANIEL H. FARNAM, of Litchfield, county of Litchfield, and State of Connecticut, have invented a new and Improved Beehive, the following being a full, clear, and exact description thereof, reference being had to the accompanying drawings, making a part of this specification, in which—

Figure 1, is a perspective view; Fig. 2, a vertical section; Fig. 3, hopper detached.

This hive can be used in a building or out of doors, and is so constructed as to effectually exclude the miller or bee moth and be thoroughly ventilated. The body of the hive is, in form, an oblong square box; the sides (*a*) of which project down below the front and back and form legs on which the hive may stand. The body of the hive is divided into two compartments by a horizontal partition (*b*) at about one-third of its height from the top. The upper compartment has a door (*c*) opening into it, the whole size of the front, which is hinged to one side; the lower one has its front divided horizontally, the lower part (*d*) being firmly fastened to the sides, the other part (*e*) being hinged to it by its lower edge, so that it can be let down when desired (it is shown in this position in Fig. 1). Behind this door a glass window (*f*) is inserted, so constructed as to be removed to get at the comb. The upper division of the hive is furnished with two boxes (*g*) which entirely fill it, having holes through their bottoms to correspond with similar holes in the partition to admit the bees into them. These boxes have sliding covers so that they can be opened at pleasure. They also have a glass in front for the purpose of examining the interior. The top of the hive (*h*) forms a cover similar to that of a chest, inclosing the whole top and having a rim extending down around the sides, so as to exclude moisture, &c. The bottom of the hive (*i*) is in the form of a truncated inverted pyramid, having an oblong opening at its lower section, for the entrance of the bees, and furnished with a tin slide (*k*) that may be closed when the bees are to be confined; it is pierced full of small holes to admit air for ventilation. The bottom, so constructed, is made to slide under the front board and against the back in a groove (*o*) made in the side pieces. Under this bottom a board (*l*) slides in similar grooves at a little distance below it, which board is level on its upper side the width of the opening in the bottom. It is there beveled off front and back so as to form inclined planes each way.

A hole (*m*) is made in the side (*a*) opposite the partition (*b*), which also extends through it lengthwise. This hole is intersected vertically by others (*m'*) opening into it, all of them being covered at the mouth with a fine grating, so as to exclude the bees and admit at the same time a free circulation of air.

To a hive located in a building a flat tube (*n*) is affixed, the opening at the inner end of which is made to correspond with that into the bottom of the hive, the other end being extended out through the side of the building for the bees to enter at.

What I claim as my invention and desire to secure by Letters Patent, is—

1. The sliding bottom (*i*) constructed and arranged as herein described.

2. I also claim the honey boxes constructed with sliding covers, for the purpose herein set forth.

DANIEL H. FARNAM.

Witnesses:
C. BELDIN,
GEO. C. WOODRUFF.